(No Model.)
F. B. & L. E. BESSETTE.
BUCKBOARD WAGON.
No. 318,534.  Patented May 26, 1885.
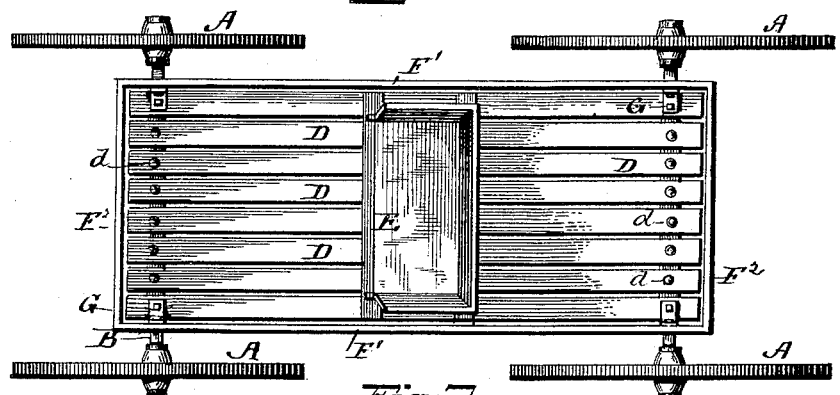
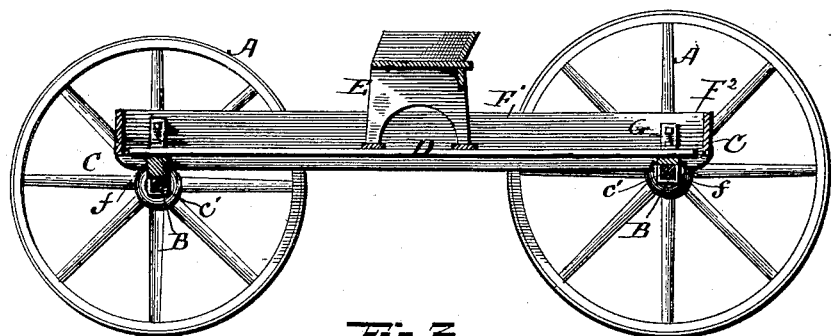
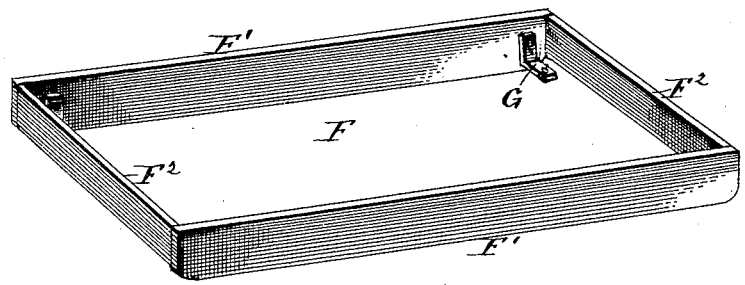
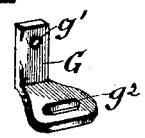
Witnesses:
L. C. Hills
W. B. Masson
Inventors:
Frank B. Bessette,
and Luke E. Bessette,
by E. E. Masson
atty.

UNITED STATES PATENT OFFICE.

FRANK B. BESSETTE AND LUKE E. BESSETTE, OF ST. CLOUD, MINNESOTA.

BUCKBOARD-WAGON.

SPECIFICATION forming part of Letters Patent No. 318,534, dated May 26, 1885.

Application filed November 15, 1884. (No model.)

*To all whom it may concern:*

Be it known that we, FRANK B. BESSETTE and LUKE E. BESSETTE, citizens of the United States, residing at St. Cloud, in the county of Stearns and State of Minnesota, have invented certain new and useful Improvements in Buckboard-Wagons, of which the following is a specification, reference being had therein to the accompanying drawings.

Our invention relates to the class of vehicles known as "buckboards," which ordinarily consist of a running-gear composed simply of the wheels secured upon axles connected by wooden slats, which serve the threefold purpose of a vehicle connection between the axles, a floor for the vehicle, and an elastic or spring support for the seat.

The object of our invention is to provide a vehicle of this description with a box or body which will surround or inclose the sides and ends of the slatted floor, and will admit of the free vibration or flexure of the slats, as will hereinafter appear.

In the accompanying drawings, Figure 1 is a plan view of a buckboard embodying our invention; Fig. 2, a longitudinal sectional view of the same; Fig. 3, a perspective view of the side-boards or body detached from the vehicle, and Fig. 4 a perspective view of one form of angle-iron or shoe for connecting the sideboards with the slats and axle.

The wheels A and axles B are of ordinary construction. Bolsters C, formed of strips of wood, are secured by loops C' upon the upper sides of the axle to provide means of attachment for the slats D by bolts or rivets $d$ in the ordinary manner, and if the bolsters are of different thickness will serve to compensate for the unequal diameter of the wheels and raise the forward ends of the slats to a horizontal position. A seat, E, is secured to the slats, and may be made adjustable thereon in the well-known manner. The body F is formed of longitudinal side-boards F' and transverse end-boards F² firmly secured together to form a rectangular box. The side-boards F' are somewhat longer than the slats D, which will allow the end-boards F² to inclose the ends of the slats D. The side-boards F' project below the end-board F², and also below the slats D, and fit closely against, but without binding, the outer slats, by which means the slatted floor of the vehicle will be at all times snugly inclosed by the box, and the slats will be allowed to spring down to the limit of their elasticity without passing beneath and beyond the inclosing sides of the box. The ends of the side-boards F' may be cut away or rounded at $f$ to improve the appearance of the box.

The body is connected to the slats and axles at its corners by shoes G in the following preferred manner, to provide further means for accommodating the body to the vibration of the slats and the corresponding movement of the axles: The shoe G may be firmly bolted to the axle and slats or bolster, and swing loosely upon a bolt, $g'$, projecting inwardly from the body, as shown in Figs. 1, 2, and 3, or the shoe may be securely bolted to the body and be formed with a slot, $g^2$, in the portion which rests upon the slats, through which slot a bolt secured to the slats may pass, and thus allow the axle a slight movement lengthwise of the body to admit of the bending of the slatted bottom. A simple link or any other preferred and well-known flexible connection may be substituted for the shoe G without departing from the spirit of our invention. The buckboard is strong, light, and easy-riding, and well adapted to rough mountain-roads, and, as such wagons are extensively used for carrying mail-bags, light packages, and baggage, the inclosing-box will naturally enhance the usefulness of this class of vehicles.

We claim as our invention and desire to secure by Letters Patent—

1. The combination, in a buckboard-wagon, of the wheels and axles, the slats secured at their ends to the axles and forming a springbottom, and a bottomless encircling-box to inclose the spring-bottom, substantially as described.

2. The combination of the wheels A, axles B, slats D, secured to the axles, and box F, the side-boards of which are arranged to project below the slats, substantially as and for the purpose described.

3. The combination of the wheels, the axles, the slats secured to said axles, and a box or body flexibly connected to the slats and axles, substantially as and for the purpose described.

In testimony whereof we affix our signatures in presence of two witnesses.

FRANK B. BESSETTE.
    LUKE E. BESSETTE.

Witnesses:
 ANDREW C. ROBERTSON,
 C. SCHULTEN.